(12) United States Patent
Walters et al.

(10) Patent No.: US 7,484,428 B2
(45) Date of Patent: Feb. 3, 2009

(54) AUTOMATIC TRANSMISSION FOR A MOTORCYCLE

(75) Inventors: Richard L. Walters, Plano, IL (US); Richard L. Walters, II, Lombard, IL (US)

(73) Assignee: Walters Manufacturing, Inc., Plano, IL (US)

(*) Notice: Subject to any disclaimer, the term of this patent is extended or adjusted under 35 U.S.C. 154(b) by 298 days.

(21) Appl. No.: 11/388,658

(22) Filed: Mar. 24, 2006

(65) Prior Publication Data

US 2007/0221000 A1    Sep. 27, 2007

(51) Int. Cl.
F16H 3/08    (2006.01)
(52) U.S. Cl. .......................................... 74/333
(58) Field of Classification Search ............... 74/333, 74/355
See application file for complete search history.

(56) References Cited

U.S. PATENT DOCUMENTS

| | | | |
|---|---|---|---|
| 2,126,547 A | 8/1938 | Fottinger | |
| 2,449,608 A | 9/1948 | May, Jr. | |
| 2,835,143 A | 5/1958 | Kelbel | |
| 2,892,355 A | 6/1959 | Hans | |
| 2,897,690 A | 8/1959 | Maier | |
| 2,949,047 A | 8/1960 | Burckhardt | |
| 3,266,608 A | 8/1966 | Lemieux | |
| 3,442,155 A | 5/1969 | Clark | |
| 3,769,857 A | 11/1973 | Whateley | |
| 4,060,005 A | 11/1977 | Bost | |
| 4,070,925 A | 1/1978 | Yoshida | |
| 4,106,364 A | 8/1978 | Zenker et al. | |
| 4,131,185 A | 12/1978 | Schall | |
| 4,157,044 A | 6/1979 | Peltz | |
| 4,497,222 A | 2/1985 | Nagaoka et al. | |
| 4,523,491 A | 6/1985 | Dittmann, Jr. | |
| 4,623,055 A | 11/1986 | Ohkubo | |
| 4,627,312 A | 12/1986 | Fujieda et al. | |
| 4,637,354 A | 1/1987 | Tominaga et al. | |
| 4,649,773 A * | 3/1987 | Svab ........................... | 475/66 |
| 4,702,340 A | 10/1987 | Hamilton | |
| 5,030,179 A * | 7/1991 | Ganoung ..................... | 475/50 |
| 5,079,965 A | 1/1992 | Leber et al. | |
| 5,259,260 A | 11/1993 | Schneider | |
| 5,385,064 A * | 1/1995 | Reece ......................... | 74/331 |
| 5,425,283 A * | 6/1995 | Wehking ..................... | 74/331 |
| 5,862,717 A | 1/1999 | May et al. | |
| 6,155,125 A | 12/2000 | Negherbon et al. | |
| 6,386,067 B1 | 5/2002 | Inoue et al. | |
| 6,484,858 B1 | 11/2002 | Mimura | |
| 6,604,438 B2 | 8/2003 | Ruhle et al. | |
| 6,655,226 B2 | 12/2003 | Oguri | |

(Continued)

*Primary Examiner*—Ha D. Ho
(74) *Attorney, Agent, or Firm*—Erickson Law Group, PC

(57) ABSTRACT

An automatic transmission for a motorcycle includes a fluid torque converter and a geartrain. The torque converter includes a torque converter housing, a torque converter input pulley arranged to receive rotary power from the motorcycle engine and a torque converter output shaft for transmitting rotary power. The geartrain includes a main shaft driven by the torque converter output and a parallel countershaft. The main shaft carries a plurality of main gears. The countershaft carries a plurality of counter gears forming selectable gear pairs with the main gears. An output pulley driven by the countershaft is rotatably carried on the main shaft between the torque converter and the gear pairs. The output pulley and the torque converter input pulley are on a same side of the transmission.

18 Claims, 7 Drawing Sheets

U.S. PATENT DOCUMENTS

| | | |
|---|---|---|
| 6,709,356 B2 | 3/2004 | Fuhrer et al. |
| 6,895,832 B2 | 5/2005 | Ishihara et al. |
| 6,910,987 B2 | 6/2005 | Richards |
| 2001/0025754 A1 | 10/2001 | Yoshimoto et al. |
| 2002/0033063 A1 | 3/2002 | Hojyo et al. |
| 2005/0087032 A1 | 4/2005 | Kawakubo et al. |
| 2005/0204863 A1 | 9/2005 | Takano |

* cited by examiner

AUTOMATIC TRANSMISSION FOR A MOTORCYCLE

FIELD OF THE INVENTION

This invention relates in general to transmissions and in particular to motorcycle transmissions.

BACKGROUND OF THE INVENTION

HARLEY DAVIDSON motorcycle owners are loyal and enthusiastic about their motorcycles. Owners of HARLEY DAVIDSON motorcycles are generally not reluctant to modify, customize or improve their motorcycles. Aftermarket parts and kits to modify HARLEY DAVIDSON motorcycles are popular.

The traditional HARLEY DAVIDSON drivetrain includes a V-TWIN engine positioned forward the transmission in which both the engine and transmission are independently secured or bolted together and secured to the motorcycle frame. In particular, HARLEY DAVIDSON V-TWIN engine motorcycles incorporate separate cases for the engine and the transmission.

In one well-known configuration, the drivetrain assembly comprises a leftside drive in which the engine includes a crankshaft and output shaft substantially parallel to an input shaft of the transmission. Engine power is coupled to the transmission with a primary belt or chain interconnecting the parallel output and inputs shafts of the engine and transmission respectively. The drive assembly additionally includes a primary drive housing on the leftside of the motorcycle for enclosing the primary belt or chain interconnecting the parallel output and input shafts.

The present inventors have recognized that as riders of motorcycles age, the strength and coordination required to clutch and shift a four or five-speed motorcycle transmission using coordinated movement of arms and legs, can be problematic. The coordinated movements can become too physically taxing for older riders.

The present inventors have recognized the desirability of providing motorcycles, particularly HARLEY DAVIDSON and like motorcycles with a compact and effective automatic transmission that can make the motorcycle more easily operated by older riders or physically impaired riders.

The present inventors have recognized that the HARLEY DAVIDSON V-TWIN engine motorcycle is a likely candidate for a transmission modification to accommodate an automatic transmission given the separate casings for the engine and transmission on these motorcycles.

There have been attempts to provide a motorcycle with an automatic transmission. Such attempts include those disclosed in U.S. Pat. Nos. 6,390,262; 4,702,340; 5,951,434; 6910,987 and 5,862,717. Some of the embodiments described in these patents however suffer the drawbacks of providing an automatic transmission that is overly complex, bulky, or not adaptable to be easily installed on a HARLEY DAVIDSON motorcycle.

SUMMARY OF THE INVENTION

The invention provides an automatic transmission for a motorcycle including a torque converter and a geartrain. The torque converter includes a torque converter housing, a torque converter input pulley arranged to receive rotary power from the motorcycle engine and a torque converter output shaft for transmitting rotary power. The torque converter includes fluid coupling elements arranged within the housing to transmit torque between the torque converter input pulley and the torque converter output shaft.

The geartrain includes a main shaft for receiving rotary power from the torque converter output and a countershaft arranged in parallel to the main shaft. The main shaft carries a plurality of main gears. The countershaft carries a plurality of counter gears. A plurality of gear pairs are formed by each of the main gears being arranged to form one gear pair with one of the counter gears, the gear pairs being in constant mesh. An output pulley is rotatably mounted on the main shaft between the torque converter and the plurality of gear pairs. A plurality of clutch devices are arranged to select a gear pair from the plurality of gear pairs that will transmit torque to the output pulley.

According to one preferred embodiment, at least one clutch device comprises a clutch plate or drum fixed on the main shaft, and at least one clutch friction disk arranged between the clutch plate and one gear of the select gear pair. The friction disk is selectively engageable to the clutch plate and to the one gear to transmit torque between the clutch plate and the one gear.

According to another preferred embodiment, at least one clutch device comprises a clutch plate fixed on the countershaft, and at least one clutch friction disk arranged between the clutch plate and one gear of the select gear pair. The friction disk is selectively engageable to the clutch plate and to the one gear to transmit torque between the clutch plate and the one gear.

The geartrain can be a four speed geartrain, wherein a first gear is furthest from the torque converter. A second gear can be located between the first gear and the torque converter. A third gear can be located between the second gear and the torque converter. A fourth gear can be located between the third gear and the output pulley.

According to the preferred embodiment, the torque converter input pulley is located between the torque converter and the output pulley and the torque converter input pulley and the output pulley are coaxially arranged.

According to a preferred embodiment the clutch devices each comprise one clutch plate fixed to the main shaft or the counter shaft and has engageable opposite sides. The clutch plate is arranged between alternately selectable gear pairs, and at least one friction disk is arranged between each of the selectable gear pairs and one engageable opposite side of the clutch plate. Each friction disk is selectively actuatable to engage one gear of the selectable gear pair to the clutch plate to transmit torque between the clutch plate and the selectable gear pair to transmit torque to the output pulley.

The transmission assembly of the present invention provides a compact, relatively simple automatic transmission that is particularly adapted for use on HARLEY DAVIDSON motorcycles, and other motorcycles that incorporate a separate casing for each of the engine and transmission. The transmission assembly of the present invention can also be incorporated into motorcycles that use a common casing for the engine and the transmission, with some additional modifications. Furthermore the invention may be useful for other type vehicles where a compact design is advantageous.

Numerous other advantages and features of the present invention will be become readily apparent from the following

DETAILED DESCRIPTION OF THE PREFERRED EMBODIMENTS

Figure 1:
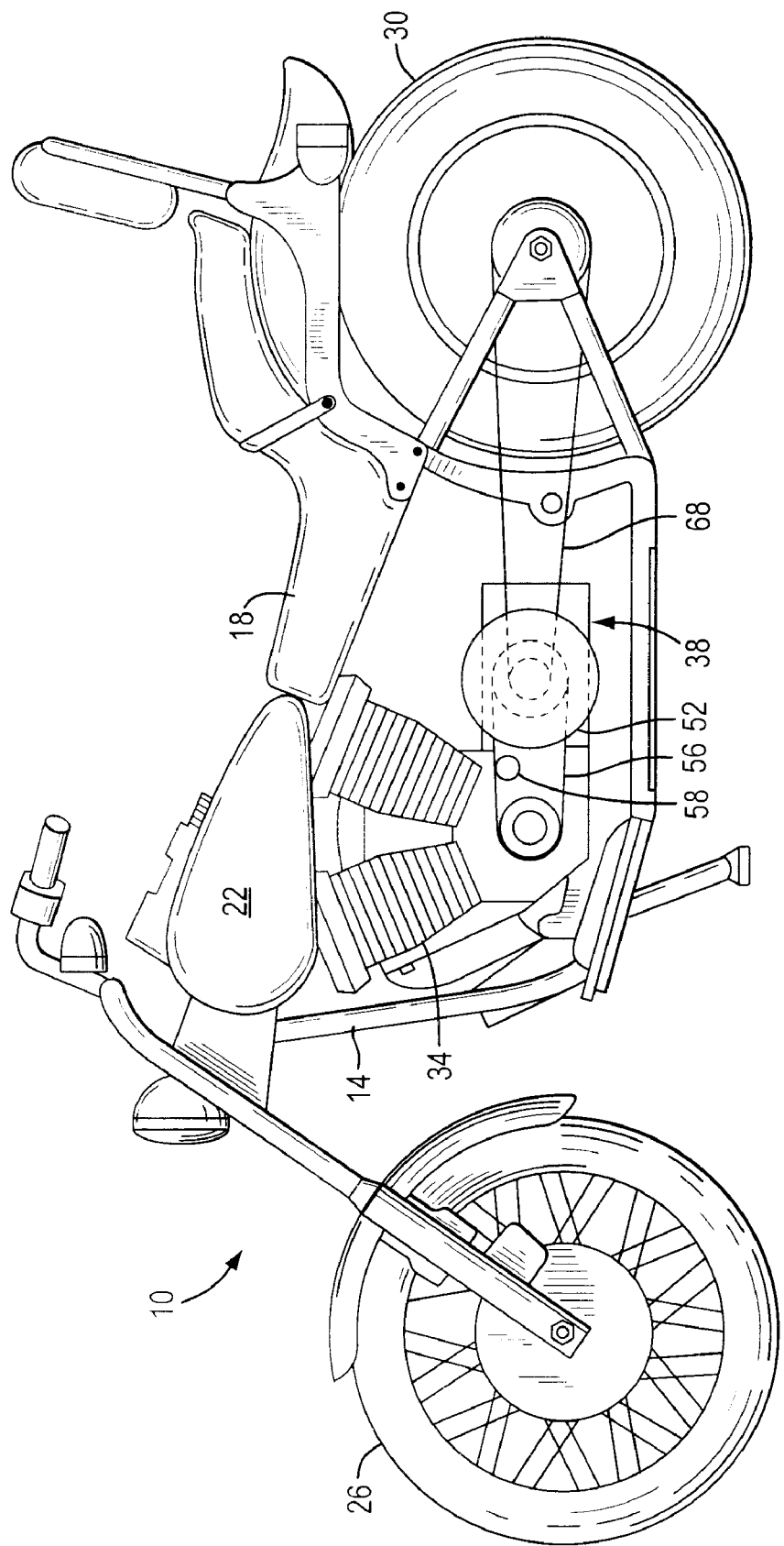
FIG. 1 is a schematic side view of a motorcycle that incorporates the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a motorcycle 10 including a frame 14. A seat 18, a fuel tank 22, front and rear wheels 26, 30, engine 34 and a transmission assembly 38 are mounted to the frame 14. The engine 34 illustrated is a V-TWIN engine popular on HARLEY DAVIDSON motorcycles.

Figure 2:
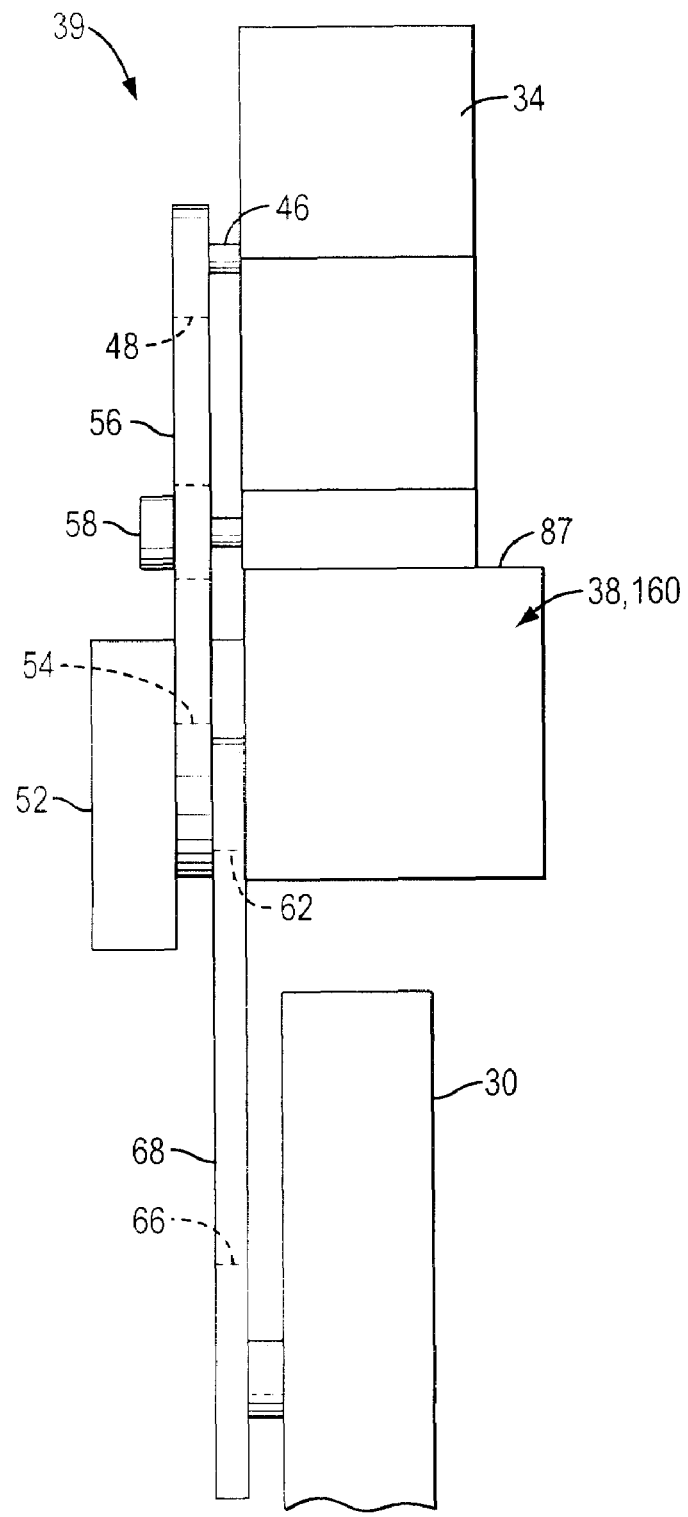
FIG. 2 is a schematic plan view of a drivetrain of the motorcycle of FIG. 1.

FIG. 2 illustrates a drive train 39 of the motorcycle shown in FIG. 1. The drive train 39 includes the engine 34, the transmission assembly 38 and the rear wheel 30. The engine 34 transmits rotary power via its crankshaft to an engine output shaft 46. The engine output shaft 46 is connected to an engine drive sprocket 48.

The transmission assembly 38 includes a torque converter 52 that has a torque converter drive sprocket 54.

A primary drive chain 56 is wrapped around the engine drive sprocket 48 and the torque converter drive sprocket 54. An oil pump 58 that provides transmission oil or fluid to the torque converter is also driven to rotate, and pump oil, by the circulating drive chain 56. Alternately, the oil pump can be driven directly by a gearing relationship (not shown) to the torque converter 52 or the drive sprocket 54. The transmission assembly 38 includes a transmission output pulley 62. A rear drive pulley 66 is operatively connected to the rear wheel 30 to rotate the rear wheel 30. A secondary drive chain 68 is wrapped around the output pulley 62 and the rear drive pulley 66.

The terms "sprocket" and "pulley" denote elements having outside features that are engageable by either a chain or a belt, to be rotated. A sprocket and a pulley can be identical in structure, and accordingly the terms are used interchangeably herein.

First Embodiment of the Invention

Figure 3:
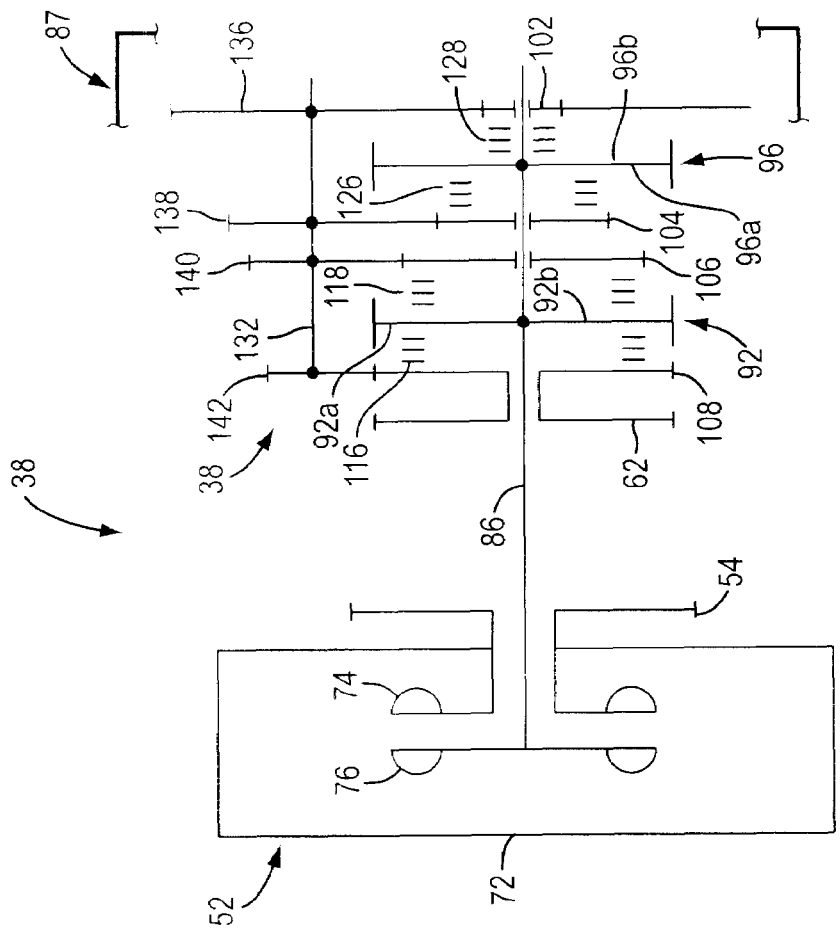
FIG. 3 is a schematic plan view of the transmission shown in FIG. 2.
Figure 3:
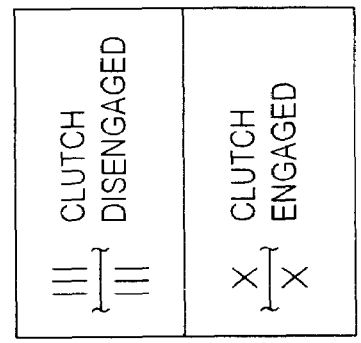

FIG. 3 illustrates the transmission assembly 38. The torque converter 52 includes a torque converter housing 72. Within the housing 72 are a driving rotary element 74 and a driven rotary element 76. The torque converter is shown in a simplistic way. For example, a stator can also be included within the housing between the driving rotary element 74 and the driven rotary element 76. Torque converters are well known and are described for example in U.S. Pat. Nos. 4,070,925; 5,862,717; 2,897,690; 2,449,608; 6,655,226; 6,390,262; and 6,805,026, all herein incorporated by reference. According to one possible embodiment, a relatively small torque converter such as one available from a HONDA automobile could be made to work in a satisfactory manner. The torque converter housing 72, the driving rotary element 74, and the input pulley 54 are all fixed to rotate together. The driven rotary element 76 is fixed to a main shaft 86 of the transmission assembly 38. The torque converter housing 72 is journaled on the main shaft 86 or on a suitable extension thereof, by bearings and oil seals (not shown).

The main shaft 86 penetrates into a transmission casing 87 (shown in FIG. 2) of the transmission assembly 38. The main shaft 86 receives rotary power from the torque converter 52 via a fluid coupling between the driving rotary element 74 and the driven rotary element 76, by rotation of the torque converter components 54, 72, 74. The main shaft 86 transmits rotary power to clutch plates 92, 96 that are fixed on the main shaft 86 to rotate therewith. The clutch plates 92, 96 can be keyed or splined to the shaft 86 or otherwise fixedly fastened to the shaft 86. The clutch plates include clutch engaging opposite sides 92a, 92b; 96a, 96b.

Preferably, the clutch assemblies are multiple disk wet clutches. The clutch plates are shown schematically as flat plates but are preferably of a drum configuration having a plurality of friction plates that are interleaved with friction disks of the clutch friction disk assembly such as shown and described in FIG. 13 and U.S. Pat. Nos. 4,623,055; 5,103,953; 4,131,185 or 3,266,608, all incorporated by reference.

The output pulley 62, a first drive gear 102, a second drive gear 104, a third drive gear 106, and a fourth drive gear 108 are mounted axially on the main shaft 86 but are free to rotate on the main shaft, i.e., are relatively rotatable with respect to the main shaft 86. The fourth drive gear 108 is fixed to the output pulley 62.

Clutch friction disks 116 are mounted on the main shaft 86 between the fourth drive gear 108 and the clutch plate 92. Clutch friction disks 118 are mounted on the main shaft 86 between the clutch plate 92 and the third drive gear 106. The clutch friction disks 116, 118 are free to rotate on the main shaft 86, i.e., are relatively rotatable with respect to the main shaft 86. The clutch disks 116 can be fastened to the fourth drive gear 108 to rotate therewith. The clutch disks 118 can be fastened to the third drive gear 106 to rotate therewith.

Clutch friction disks 126 are mounted on the main shaft 86 between the second drive gear 104 and the clutch plate 96. Clutch friction disks 128 are mounted on the main shaft 86 between the clutch plate 96 and the first drive gear 102. The clutch friction disks 126, 128 are free to rotate on the main shaft 86, i.e., are relatively rotatable with respect to the main shaft 86. The clutch friction disks 126 can be fastened to the second drive gear 104 to rotate therewith. The clutch disks 128 can be fastened to the first drive gear 102 to rotate therewith.

A countershaft 132 is mounted within the transmission casing 87, parallel to the main shaft 86. A first counter gear 136, a second counter gear 138, a third counter gear 140, and a fourth counter gear 142 are all fixedly mounted on the countershaft 132 to rotate therewith, i.e., there is no relative rotation between the gears 136, 138, 140, 142 and the countershaft 132. The gears 136, 138, 140, 142 can be keyed or splined to the countershaft 132 or otherwise fixedly fastened to the countershaft 132.

The gears 102, 104, 106, 108, 136, 138, 140, 142 all have outer circumferential teeth. The gear pairs 102, 136; 104, 138; 106, 140 and 108, 142 are each in constant meshing relationship.

FIG. 3 illustrates a symbol key for "clutch disengaged" and "clutch engaged" which is correct for FIGS. 4 through 11. FIG. 3 illustrates the transmission assembly 38 in a neutral gear mode since none of the clutches is engaged.

Figure 4:
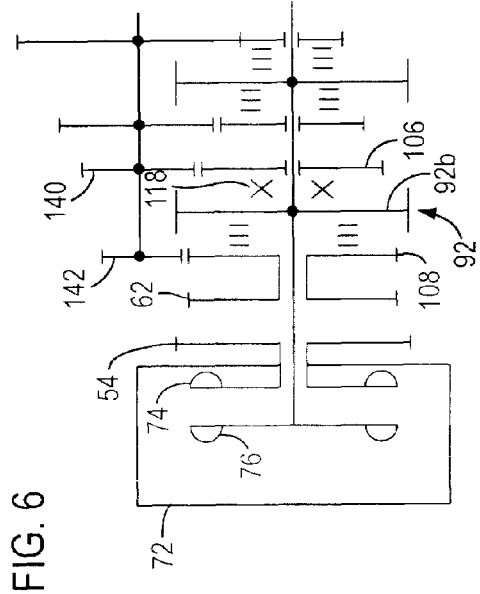
FIG. 4 is a schematic plan view of the transmission of FIG. 3 with the transmission shown in first gear configuration.

FIG. 4 illustrates the operation of the transmission in first gear mode. The torque converter 52 is turned via the input pulley 54. A fluid coupling within the torque converter turns the main shaft 86. The main shaft 86 turns the clutch plate 96 which turns first gear 102 via the clutch friction disks 128 which are selected by a controller 145 (FIG. 12) to be engaged to the clutch plate 96. First gear 102 turns the corresponding first counter gear 136, which turns the countershaft 132, which turns the fourth counter gear 142, which turns the fourth gear 108 that is fixed to the output pulley 62. The output pulley 62 is turned, which turns the rear wheel 30 via the drive sprocket 66 and the secondary chain 68.

Figure 5:
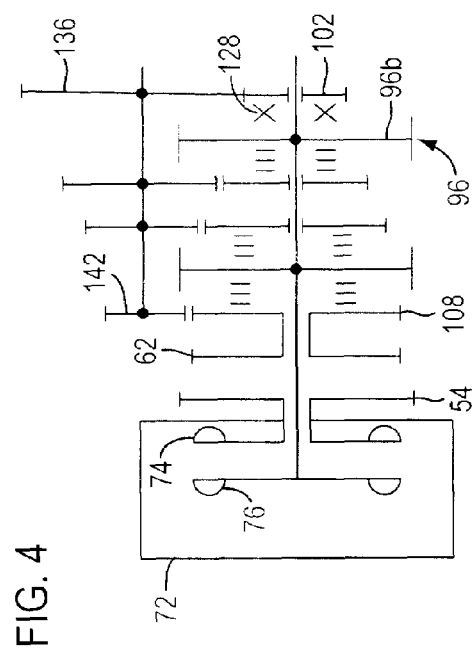
FIG. 5 is a schematic plan view of the transmission of FIG. 3 with the transmission shown in second gear configuration.

FIG. 5 illustrates the operation of the transmission in second gear mode. The torque converter 52 is turned via the input pulley 54. A fluid coupling within the torque converter turns the main shaft 86. The main shaft 86 turns the clutch plate 96, which turns the second gear 104 via the clutch friction disks 126 which are selected by the controller 145 to be engaged to the clutch plate 96. Second gear turns the corresponding second counter gear 138, which turns the countershaft 132, which turns the fourth counter gear 142, which turns the fourth gear 108 which is fixed to the output pulley 62. The output pulley 62 is turned which turns the rear wheel 30 via the drive sprocket 66 and the secondary chain 68.

Figure 6:
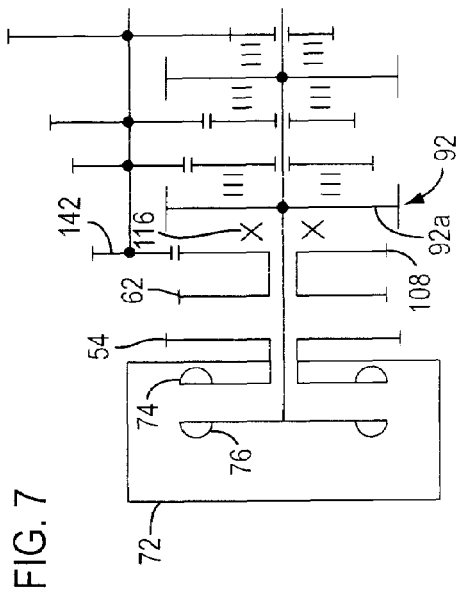
FIG. 6 is a schematic plan view of the transmission of FIG. 3 with the transmission in third gear configuration.

FIG. 6 illustrates the operation of the transmission in third gear mode. The torque converter 52 is turned via the input pulley 54. A fluid coupling within the torque converter turns the main shaft 86. The main shaft 86 turns the clutch plate 92 which turns third gear 106 via the clutch friction disks 118 which are selected by the controller 145 to be engaged to the clutch plate 92. Third gear 106 turns the corresponding third counter gear 140 which turns the countershaft 132, which turns the fourth counter gear 142 which turns the fourth gear 108 which is fixed to the output pulley 62. The output pulley 62 is turned which turns the rear wheel 30 via the drive sprocket 66 and the secondary chain 68.

Figure 7:
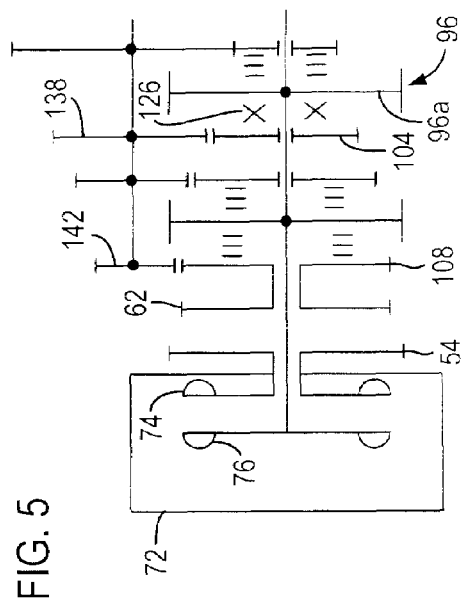
FIG. 7 is a schematic plan view of the transmission of FIG. 3 with the transmission shown in fourth gear configuration.

FIG. 7 illustrates the operation of the transmission in fourth gear mode. The torque converter 52 is turned via the input pulley 54. A fluid coupling within the torque converter turns the main shaft 86. The main shaft 86 turns the clutch plate 92 which turns fourth gear 108 via the clutch friction disks 116 which are selected by the controller 145 to be engaged to the clutch plate 92. Fourth gear 108 turns the output pulley which is fixed thereto. The output pulley 62 is turned which turns the rear wheel 30 via the drive sprocket 66 and the secondary chain 68.

Second Embodiment of the Invention

Figure 8:
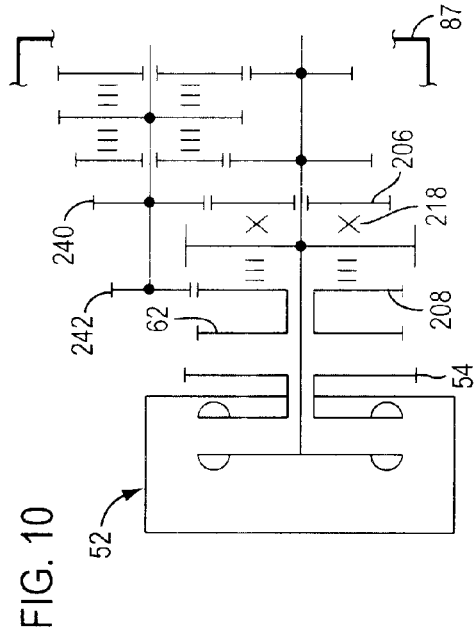
FIG. 8 is a schematic plan view of an alternate embodiment transmission with the transmission shown in first gear configuration.

FIG. 8 illustrates an alternate transmission assembly 160. Unless otherwise stated the components for the second embodiment are the same as for the first embodiment. The torque converter 52 is the same as described in the first embodiment. The driven rotary element 76 is fixed to a main shaft 186 of the transmission assembly 160. The torque converter housing 72 is journaled on the main shaft 186 or on a suitable extension thereof, by bearings and oil seals (not shown).

Figure 9:
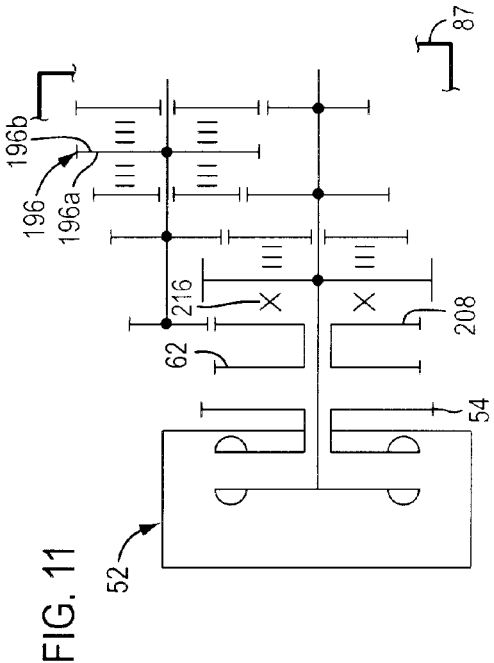
FIG. 9 is a schematic plan view of the transmission of FIG. 8 with the transmission shown in second gear configuration.

The main shaft 186 penetrates into the transmission casing 87 (shown in FIG. 2) of the transmission assembly 160. The main shaft 186 receives rotary power from the torque converter 52 via a fluid coupling between the driving rotary element 74 and the driven rotary element 76, by rotation of the torque converter components 54, 72, 74. The main shaft 186 transmits rotary power to a clutch plate 192 that is fixed on the main shaft 186 to rotate therewith. The clutch plate 192 can be keyed or splined to the shaft 186 or otherwise fixedly fastened to the shaft 186. The clutch plate 192 includes clutch engaging opposite sides 192a, 192b (FIG. 9).

The output pulley 62, a first drive gear 202, a second drive gear 204, a third drive gear 206 and a fourth drive gear 208 are axially mounted on the main shaft 186. The third drive gear 206 and the fourth drive gear 208 are free to rotate on the main shaft, i.e., are relatively rotatable with respect to the main shaft 86. The fourth drive gear 108 is fixed to the output pulley 62. The first drive gear 202 and the second drive gear 204 are fixed to the main shaft 186 to rotate therewith. The first drive gear 202 when the second drive gear 204 can be keyed or splined to the shaft 186 or otherwise fixedly fastened to the shaft 186.

Clutch friction disks 216 are mounted on the main shaft 186 between the fourth drive gear 208 and the clutch plate 192. Clutch friction disks 218 are mounted on the main shaft 186 between the clutch plate 192 and the third drive gear 206. The clutch friction disks 216, 218 are free to rotate on the main shaft 186, i.e., are relatively rotatable with respect to the main shaft 186. The clutch friction disks 216 can be fastened to the fourth drive gear 208 to rotate therewith. The clutch friction disks 218 can be fastened to the third drive gear 206 to rotate therewith.

Figure 11:
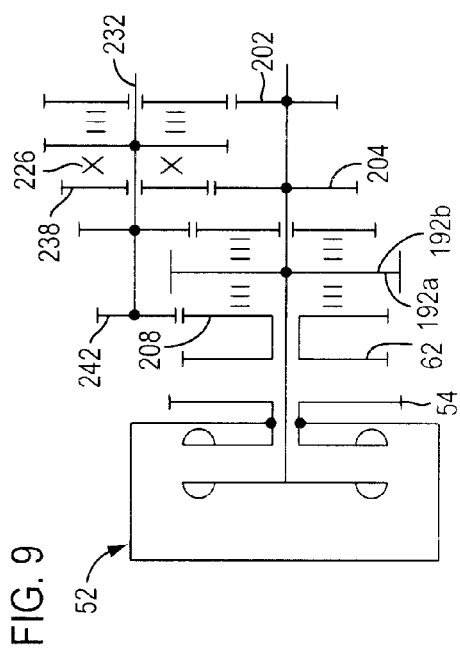
FIG. 11 is a schematic plan view of the transmission of FIG. 8 with the transmission shown in fourth gear configuration.

A countershaft 232 is mounted within the transmission casing 87, parallel to the main shaft 186. The countershaft transmits rotary power to a clutch plate 196 that is fixed on the countershaft 232 to rotate therewith. The clutch plate 196 can be keyed or splined to the countershaft 232 or otherwise fixedly fastened to the countershaft 232. The clutch plate 196 includes clutch engaging opposite sides 196a, 196b (FIG. 11).

A first counter gear 236, a second counter gear 238, a third counter gear 240 and a fourth counter gear 242 are axially mounted on the countershaft 232. The third counter gear 240 and the fourth counter gear 242 are fixed to the countershaft 232 to rotate therewith, i.e., there is no relative rotation between the gears 240, 242 and the countershaft 232. The counter gears 240, 242 can be keyed or splined to the countershaft 232 or otherwise fixedly fastened to the shaft 232. The first counter gear 236 and the second counter gear 238 are rotatably mounted on the countershaft 232, i.e., are free to rotate on the countershaft 232.

Clutch friction disks 226 are mounted on the countershaft 232 between the second counter gear 238 and the clutch plate 196. Clutch friction disks 228 are mounted on the countershaft 232 between the clutch plate 196 and the first counter gear 236. The clutch friction disks 226, 228 are free to rotate on the countershaft 232, i.e., are relatively rotatable with respect to the countershaft 232. The clutch friction disks 226 can be fastened to the second counter gear 238 to rotate therewith. The clutch friction disks 228 can be fastened to the first counter gear 236 to rotate therewith.

The gears 202, 204, 206, 208, 236, 238, 240, 242 all have outer circumferential teeth. The gear pairs 202, 236; 204, 238; 206, 240 and 208, 242 are each in constant meshing relationship.

FIG. 8 illustrates the operation of the transmission in first gear mode. The torque converter 52 is turned via the input pulley 54. A fluid coupling within the torque converter turns the main shaft 186. The main shaft 186 turns the first gear 202. First gear 202 turns the corresponding first counter gear 236. The clutch friction disks 228 are selected by the controller 145 to be engaged to fix the first counter gear 236 for rotation with the clutch plate 196, which turns the countershaft 232, which turns the fourth counter gear 242, which turns the fourth gear 208 which is fixed to the output pulley 62. The output pulley 62 is turned, which turns the rear wheel 30 via the drive sprocket 66 and the secondary chain 68.

FIG. 9 illustrates the operation of the transmission in second gear mode. The torque converter 52 is turned via the input pulley 54. A fluid coupling within the torque converter turns the main shaft 186. The main shaft 186 turns the second gear 204. Second gear 204 turns the corresponding second counter gear 238. The clutch friction disks 226 are selected by the controller 145 to be engaged to fix the second counter gear 238 for rotation with the clutch plate 196 which turns the countershaft 232, which turns the fourth counter gear 242, which turns the fourth gear 208 which is fixed to the output pulley 62. The output pulley 62 is turned, which turns the rear wheel 30 via the drive sprocket 66 and the secondary chain 68.

Figure 10:
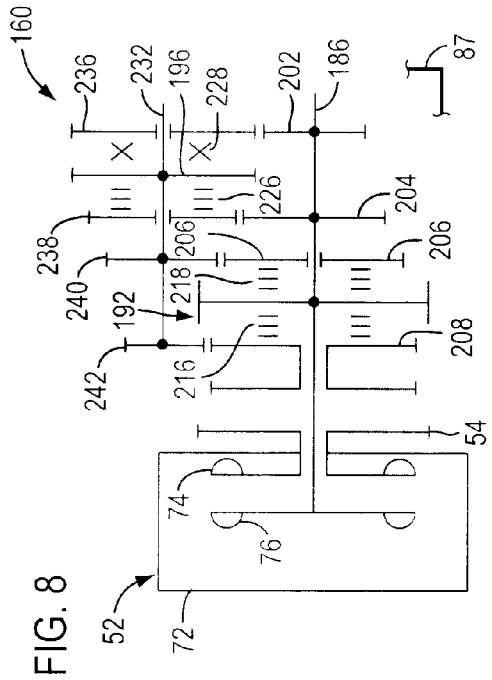
FIG. 10 is a schematic plan view of the transmission of FIG. 8 with the transmission in third gear configuration.

FIG. 10 illustrates the operation of the transmission in third gear mode. The torque converter 52 is turned via the input pulley 54. A fluid coupling within the torque converter turns the main shaft 186. The main shaft 186 turns the clutch plate 192 which turns third gear 206 via the clutch friction disks 218 which are selected by the controller 145 to be engaged to the clutch plate 192. Third gear 206 turns the corresponding third counter gear 240, which turns the countershaft 232, which turns the fourth counter gear 242, which turns the fourth gear 208 which is fixed to the output pulley 62. The output pulley 62 is turned, which turns the rear wheel 30 via the drive sprocket 66 and the secondary chain 68.

FIG. 11 illustrates the operation of the transmission in fourth gear mode. The torque converter 52 is turned via the input pulley 54. A fluid coupling within the torque converter turns the main shaft 186. The main shaft 186 turns the clutch plate 192 which turns fourth gear 208 via the clutch friction disks 216 which are selected by the controller 145 to be engaged to the clutch plate 192. Fourth gear 208 turns the output pulley which is fixed thereto. The output pulley 62 is turned, which turns the rear wheel 30 via the drive sprocket 66 and the secondary chain 68.

For the embodiment of FIGS. 8-11, when none of the clutches is engaged, the controller 145 has selected, or the operator has manually selected, a neutral gear mode.

Figure 12:
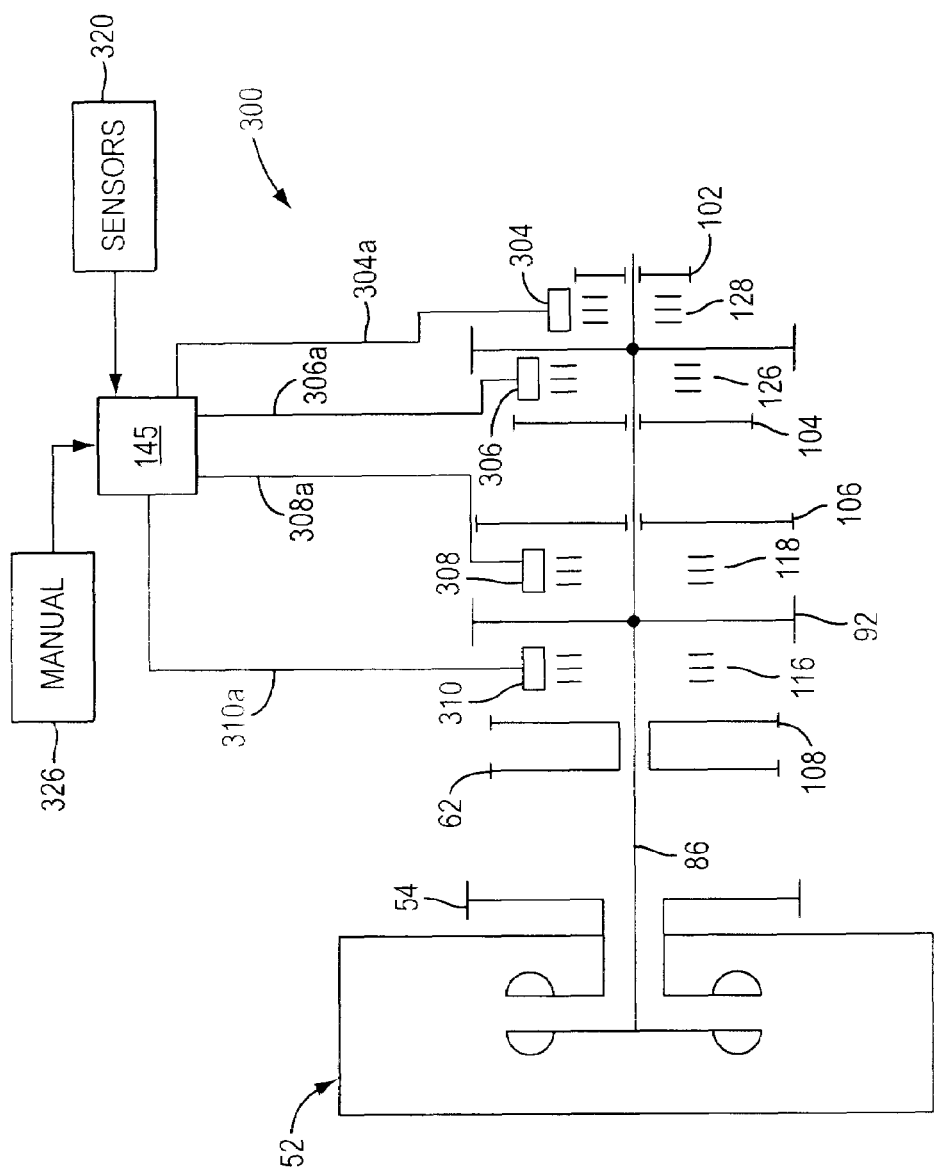
FIG. 12 is a schematic control diagram of the invention, with a countershaft assembly removed for clarity of depiction.

FIG. 12 illustrates a control system 300 of the invention applied to the first embodiment. For purposes of depiction simplicity, the countershaft 132 and the counter gears are not shown. The controller 145 is in signal-communication with clutch engagement devices 304, 306, 308, 310, through signal conductors 304a, 306a, 308a, 310a, respectively. The controller 145 receives input signals via sensors 320. The input signals can be parameters such as engine RPM, transmission RPM, throttle position, engine torque, gear lever position for gear selection, or other parameters. A manual control override 326 can be used to manually select the gear mode of operation.

The clutch engagement devices 304, 306, 308, 310 can be electromechanical devices, hydraulic or fluid operate devices such as disclosed in U.S. Pat. Nos. 2,825,235; or 4,627,312, herein incorporated by reference. Preferably, the clutch engagement devices are analog or digital solenoids that control hydraulic actuators. Solenoids can also control torque converter fluid fill and fluid line pressure. The controller 145 correlates the input from the sensors 320 to select the appropriate gear mode of operation, such as a first gear mode, second gear mode, third gear mode or fourth gear mode. The corresponding engagement device 304, 306 308, 310 is energized to engage the selected one of the friction disks 128, 126, 118 or 116, while the respective other friction disks remain disengaged; or no engagement device is engaged so the transmission remains in neutral mode.

The controller 145 can be an electronic controller and the system can be an electronic system, such as disclosed in U.S. Pat. Nos. 6,604,438 or 4,627,312, herein incorporated by reference. Alternatively, the controller 145 could be a fluid or pneumatically operated valve selector. Preferably, the controller 145 is a programmable electronic controller (PLC) that sends a signal to one or more electromagnetic valves, or solenoid valves, to control actuation of the clutches. Depending on the type of system and controller 145 and the type of engagement devices 304, 306, 308, 310, the conductors 304a, 306a, 308a, 310a can be electric wires, optical fibers, fluid lines, or other known signal carrying conduit.

Although the system 300 is illustrated in FIG. 12 with respect to the first embodiment, a similar system could be used to control gear shifting in the second embodiment as well, with the friction disks 216, 218, 226, 228 engageable by the engagement devices 310, 308, 306, 304, respectively, under control of the controller 145 in the same fashion as that described with regard to FIG. 12.

Figure 13:
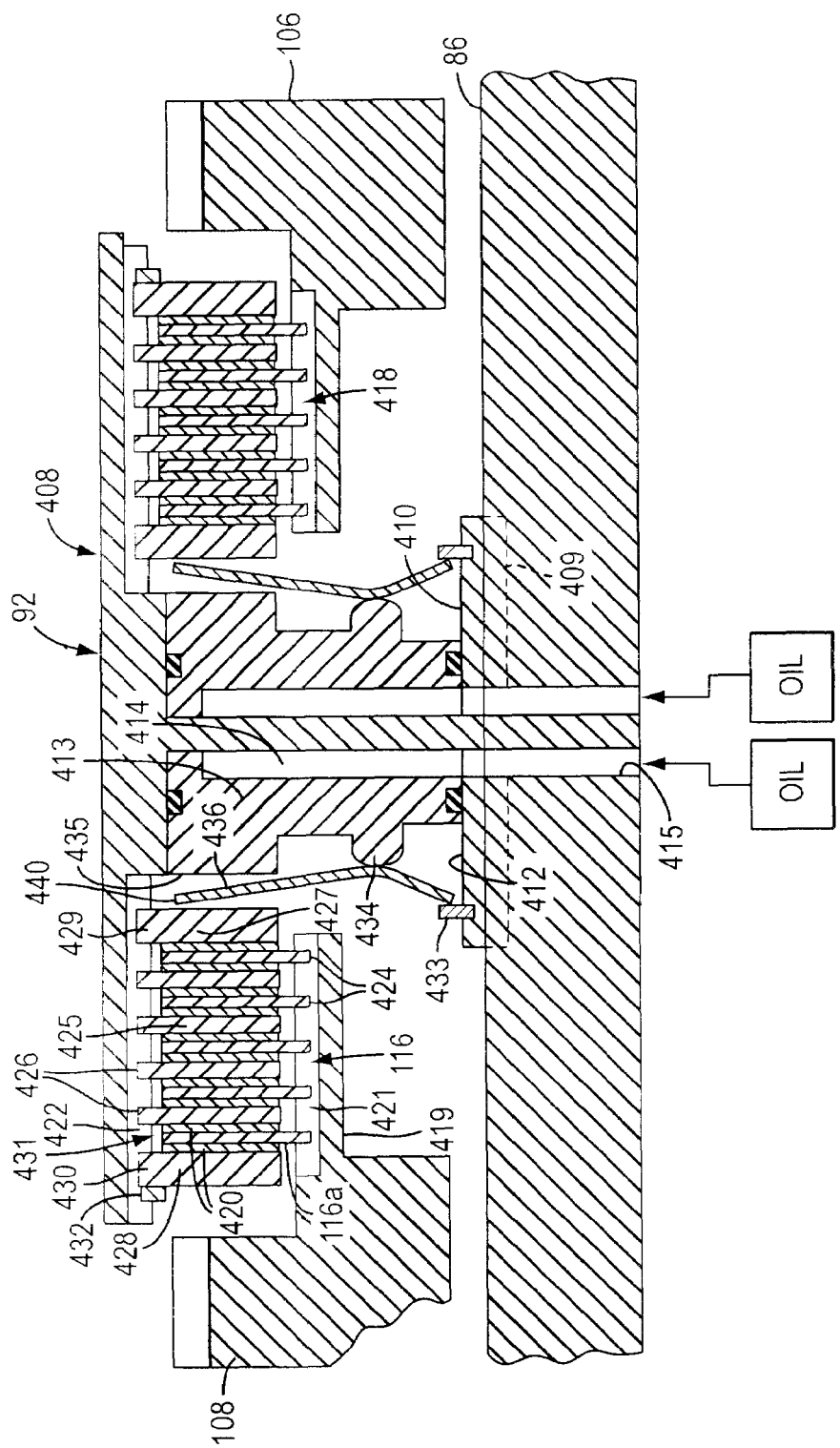
FIG. 13 is an enlarged, fragmentary, schematic, sectional view of a clutch arrangement used in the preferred embodiment of the invention.

FIG. 13 is a vertical fragmentary sectional view of a hydraulic clutch arrangement useful in the transmission of the preferred embodiments of the invention. Only the top portion of the sectional view is shown, the bottom portion being mirror image identical. The clutch plate 92 and the clutch friction disks 116, 118 and gears 108, 106 are shown as an example. The other clutch plates 96, 192, 196 and associated clutch friction disks and gears can be similarly configured.

The clutch plate 92 comprises a drum 408 that forms right and left cylinders 410, 412. Only the left side of FIG. 13 will be described as the right side is substantially mirror image identical and the operation is identical. The drum 408 can be keyed, splined or otherwise fixed to the shaft 86 at 409.

An annular hydraulic piston 413 fits slidably in the cylinder 412 to form an annular hydraulic chamber 414 between it and the cylinder 412. The hydraulic chamber 414 is connected through an oil passage 415 in the output shaft 86 and an appropriate hydraulic circuit (not shown) to the hydraulic pump 58. The gear 108 surrounds the output shaft 86 so as to be relatively rotatable thereon. A bearing (not shown) can be fit between the output shaft 86 and the gear 108.

A boss 419 is integrally provided on the gear 108, and an external spline 421 and an opposite internal spline 422 are formed on a boss outer periphery and a cylinder inner periphery, respectively. Plural input side annular friction plates 116a are slideably fitted onto the external spline 421 at inner peripheral projections 424 of the plates 116a and annular facings 420 are securely fixed to both front and rear faces of the friction plates 116a. Output side annular friction plates 425 are disposed between the adjacent input side annular friction plates 116a respectively, and the friction plates 425 are slideably fitted into the internal spline 422 at outer peripheral projection 426 of the plates 425. The right-most friction plate 116a is opposite to a thick annular pressure plate 427, and the left-most friction plate 116a is opposite to a thick annular back plate 428.

The pressure plate 427 and the back plate 428 only slideably fit into the internal spline 422 at the outer peripheral projections 429 and 430 of the pressure plate 427 and back plate 428 respectively, and the back plate 428 contacts with a snap ring 432 (stopper member). In the illustration hydraulic clutch, a friction member 431 comprises the pressure plate 427, the friction plates 116a and 425, and the back plate 428 respectively.

A snap ring 433 (stopper member) is provided on an outer periphery of the output shaft 86. The snap ring 433 is positioned at a just inner side of the pressure plate 427. A rear outer peripheral portion of the piston 413 serves as an annular presser face 435, and only a part serving as an annular projection 434 extends rearward from a rear inner peripheral portion of the piston.

Reference numeral 436 designates a coned disc spring. When the clutch is engaged from the clutch disengaged state hydraulic pressure is supplied from the pump 58 through the oil passage 415 etc. to the hydraulic chamber 414, thus the piston 413 is moved leftward. The load of the piston 413 is transmitted from the projection 434 to the contact portion 438 of the coned disc spring 436 in an early stage of clutch engagement. The piston-contacting portion 438 moves gradually radially outwardly with the increasing contact pressure by the piston. The outer peripheral end 440 of the coned disc spring contacts with the pressure plate 427 of the friction member 431. Thereafter, the load of the piston 413 begins to be transmitted through the coned disc spring 436 to the friction member 431. The load of the piston 413 is transmitted to the friction member 431 through the outer peripheral portion of the coned spring 436.

In order to disengage the clutch, it is enough to relieve the hydraulic pressure in the hydraulic chamber 414, and procedures reverse to the above-mentioned description are carried out in that case. The coned disc spring 436 serves as a return spring in this instance.

As an alternative, the disc spring can be eliminated and the piston 413 can press directly on the friction member 431.

FIGS. 1-13 are diagrammatic or schematic drawings and the description herein leaves out information that would be within the knowledge and skill of one of skill in the art. For example, the gears and shafts within the transmission casing would require the necessary bearings and oil seals for proper design and operation. The placement and design of such elements are within the skill of one of ordinary skill in the art.

From the foregoing, it will be observed that numerous variations and modifications may be effected without departing from the spirit and scope of the invention. It is to be understood that no limitation with respect to the specific apparatus illustrated herein is intended or should be inferred.

What is claimed is:

1. An automatic transmission for a motorcycle having a motorcycle engine, comprising:
    a torque converter having a torque converter housing, a torque converter input arranged to receive rotary power from the motorcycle engine and a torque converter output for transmitting rotary power, and fluid coupling elements arranged within said housing to transmit torque between the torque converter input and said torque converter output;
    a geartrain having a main shaft for receiving rotary power from said torque converter output and a countershaft arranged in parallel to said main shaft, said main shaft carrying a plurality of main gears, said countershaft carrying a plurality of counter gears, and a plurality of gear pairs formed by each of said main gears being arranged to form one gear pair with one of said counter gears, said gear pairs in constant mesh, and an output pulley arranged on said main shaft between said torque converter and said plurality of gear pairs, and a plurality of clutch devices arranged to select a gear pair from said plurality of gear pairs that will transmit torque to said output pulley.

2. The automatic transmission according to claim 1, wherein at least one clutch device comprises a clutch plate fixed on said main shaft, and at least one clutch friction disk arranged between said clutch plate and one gear of said select gear pair, said friction disk engageable to said clutch plate and to said one gear to transmit torque between said clutch plate and said one gear.

3. The automatic transmission according to claim 1, wherein at least one clutch device comprises a clutch plate fixed on said countershaft, and at least one clutch friction disk arranged between said clutch plate and one gear of said select gear pair, said friction disk engageable to said clutch plate and to said one gear to transmit torque between said clutch plate and said one gear.

4. The automatic transmission according to claim 1, wherein a first gear is furthest from said torque converter.

5. The automatic transmission according to claim 4, wherein a second gear is located between said first gear and said torque converter.

6. The automatic transmission according to claim 5, wherein a third gear is located between said second gear and said torque converter.

7. The automatic transmission according to claim 6, wherein fourth gear is between the third gear and said output pulley.

8. The automatic transmission according to claim 1, wherein said torque converter input is located between said torque converter and said output pulley.

9. The automatic transmission according to claim 1, wherein said torque converter input and said output pulley are coaxially arranged.

10. An automatic transmission for a motorcycle having a motorcycle engine, comprising:
    a torque converter having a torque converter housing, a torque converter input arranged to receive rotary power from the motorcycle engine and a torque converter output for transmitting rotary power, and fluid coupling elements arranged within said housing to transmit torque between the torque converter input and said torque converter output;
    a geartrain having a main shaft for receiving rotary power from said torque converter output and a countershaft arranged in parallel to said main shaft, said main shaft carrying a plurality of main gears, said countershaft carrying a plurality of counter gears, and a plurality of gear pairs formed by each of said main gears being arranged to form one gear pair with one of said counter gears, said gear pairs in constant mesh, and an output pulley arranged on said main shaft between said torque converter and said plurality of gear pairs, and at least one clutch plate fixed to one of said main shaft and said counter shaft and having engageable opposite sides, said clutch plate arranged between alternately selectable gear pairs, and at least one friction disk arranged between each of said selectable gear pairs and one engageable opposite side of said clutch plate, said friction disk selectively actuatable to engage one gear of said selectable gear pair and said clutch plate to transmit torque between said clutch plate and said selectable gear pair to transmit torque to said output pulley.

11. The automatic transmission according to claim 10, comprising a further clutch plate fixed on said main shaft, and at least one further friction disk arranged between said further clutch plate and one gear of a further selectable gear pair, said further friction disk engageable to said further clutch plate and to said one gear of said further selectable gear pair to transmit torque between said clutch plate and one gear of said further selectable gear pair.

12. The automatic transmission according to claim 10, comprising a further clutch plate fixed on said countershaft, and at least one further friction disk arranged between said further clutch plate and one gear of a further selectable gear pair, said further friction disk engageable to said further clutch plate and to said one gear of said further selectable gear pair to transmit torque between said clutch plate and said one gear of said further selectable gear pair.

13. The automatic transmission according to claim 10, wherein a first gear is furthest from said torque converter.

14. The automatic transmission according to claim 13, wherein a second gear is located between said first gear and said torque converter.

15. The automatic transmission according to claim 14, wherein a third gear is located between said second gear and said torque converter.

16. The automatic transmission according to claim 15, wherein fourth gear is between the third gear and said output pulley.

17. The automatic transmission according to claim 1, wherein said torque converter input is located between said torque converter and said output pulley.

18. The automatic transmission according to claim 1, wherein said torque converter input and said output pulley are coaxially arranged.

* * * * *